(12) United States Patent
Mochizuki

(10) Patent No.: US 6,320,842 B1
(45) Date of Patent: *Nov. 20, 2001

(54) SPREAD SPECTRUM COMMUNICATION APPARATUS

(75) Inventor: Norihiro Mochizuki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,418

(22) Filed: Jan. 30, 1997

(30) Foreign Application Priority Data

| Feb. 1, 1996 | (JP) | 8-016600 |
| Feb. 19, 1996 | (JP) | 8-030588 |
| Feb. 19, 1996 | (JP) | 8-030589 |

(51) Int. Cl.$^7$ ............................. H04B 7/216; H04J 13/00
(52) U.S. Cl. ......................... 370/206; 370/342; 375/130; 375/280
(58) Field of Search ................. 370/335, 342, 370/203, 206, 207, 479; 375/279, 280, 283, 308, 329, 330, 331, 332, 130, 140, 141, 142, 147, 150, 146

(56) References Cited

U.S. PATENT DOCUMENTS

| 4,930,140 | * | 5/1990 | Cripps et al. | 375/200 |
| 4,998,261 | * | 3/1991 | Van Driest et al. | 375/200 |
| 5,260,969 | | 11/1993 | Kato et al. | 375/1 |
| 5,442,625 | * | 8/1995 | Gitlin et al. | 370/342 |
| 5,467,367 | * | 11/1995 | Izumi et al. | 375/206 |
| 5,488,629 | * | 1/1996 | Takahashi et al. | 375/206 |
| 5,491,457 | * | 2/1996 | Feher | 332/103 |
| 5,537,396 | | 7/1996 | Kanda et al. | 370/18 |
| 5,615,209 | * | 3/1997 | Bottomley | 370/342 |
| 5,668,806 | * | 9/1997 | Arai et al. | 370/342 |
| 5,694,417 | * | 12/1997 | Andren et al. | 375/206 |
| 5,712,870 | * | 1/1998 | Petrick | 375/206 |
| 5,729,570 | * | 3/1998 | Magill | 375/206 |
| 5,784,402 | * | 7/1998 | Feher | 375/200 |
| 5,815,526 | * | 9/1998 | Rice | 375/206 |
| 5,881,099 | * | 3/1999 | Takahashi et al. | 375/206 |
| 5,956,328 | * | 9/1999 | Sato | 370/335 |

FOREIGN PATENT DOCUMENTS

| 0687074 | 12/1995 | (EP) | H04B/1/707 |
| 0708534 | 4/1996 | (EP) | H04B/1/707 |
| 0622920 | 11/1994 | (EP) | H04J/13/00 |
| 8167864 | 6/1996 | (JP) | H04B/1/707 |

OTHER PUBLICATIONS

Yu, M. et al., An Improved pi/4—DQPSK Compatible Feher's "pi/4—FQPSK" Nonlinearly Amplified Modulation, Vehicular Technology Conference, 1995 IEEE 45th, Jul. 28, 1998.*

Kubota, S. et al., A Time Diversity CDMA Scheme Employing Orthogonal Modulation For Time Varying Channels, Vehicular Technology Conference, 1993, 43rd IEEE, May 20, 1993.*

Lee, W., Mobile Cellular Telecommunications, pp. 519–520, 1995.*

* cited by examiner

Primary Examiner—Alpus H. Hsu
(74) Attorney, Agent, or Firm—Fitzpatrick, Cella, Harper & Scinto

(57) ABSTRACT

In a communication apparatus of the transmitting side, n number of parallel signals are respectively spread-modulated by the n number of spreading codes and summation thereof is obtained. Also, m number of parallel signals are respectively spread-modulated by the m number of spreading codes and summation thereof is obtained. These two signals are modulated with quadrature carriers, synthesized and transmitted to the receiving side.

11 Claims, 18 Drawing Sheets

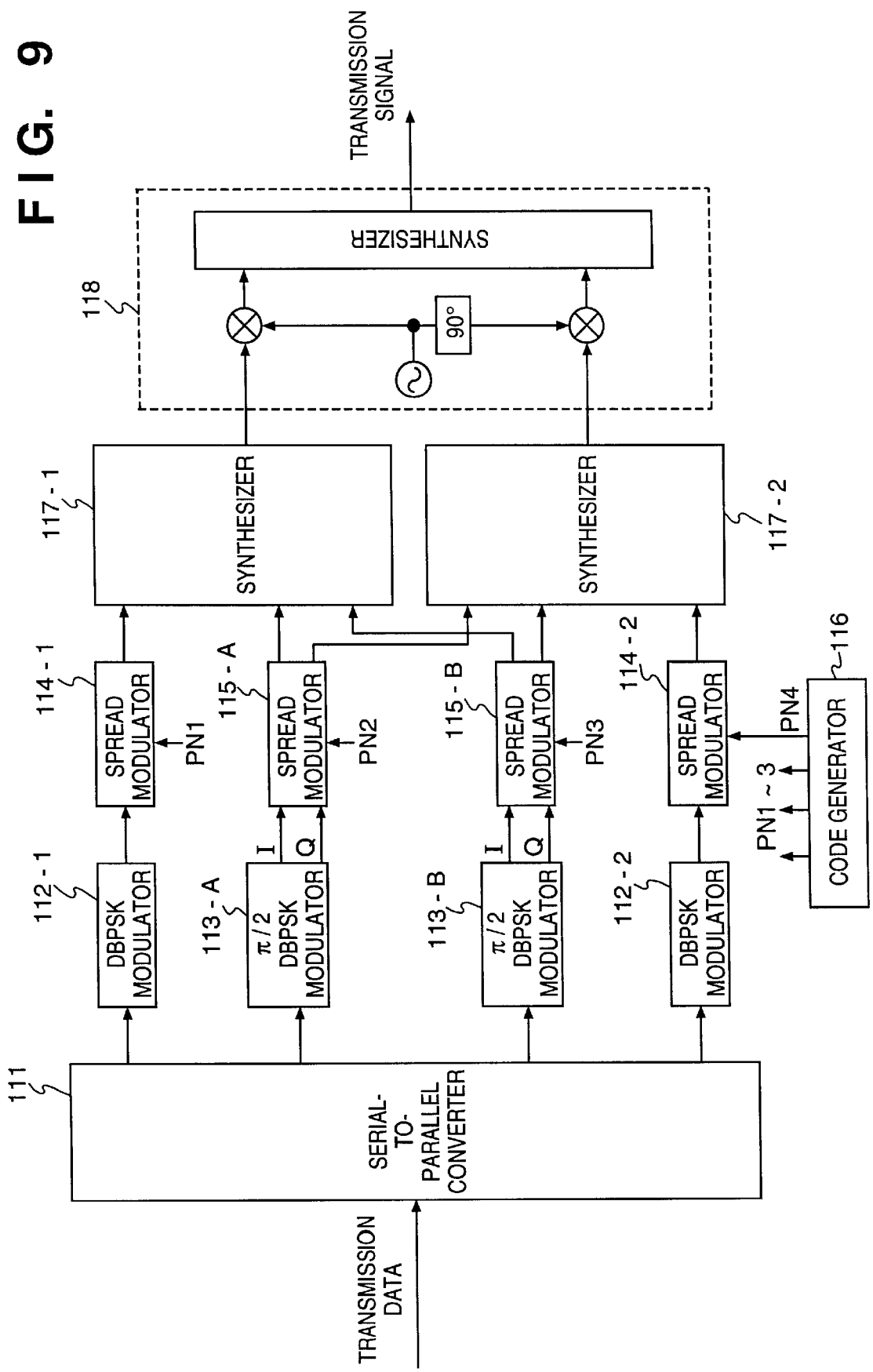

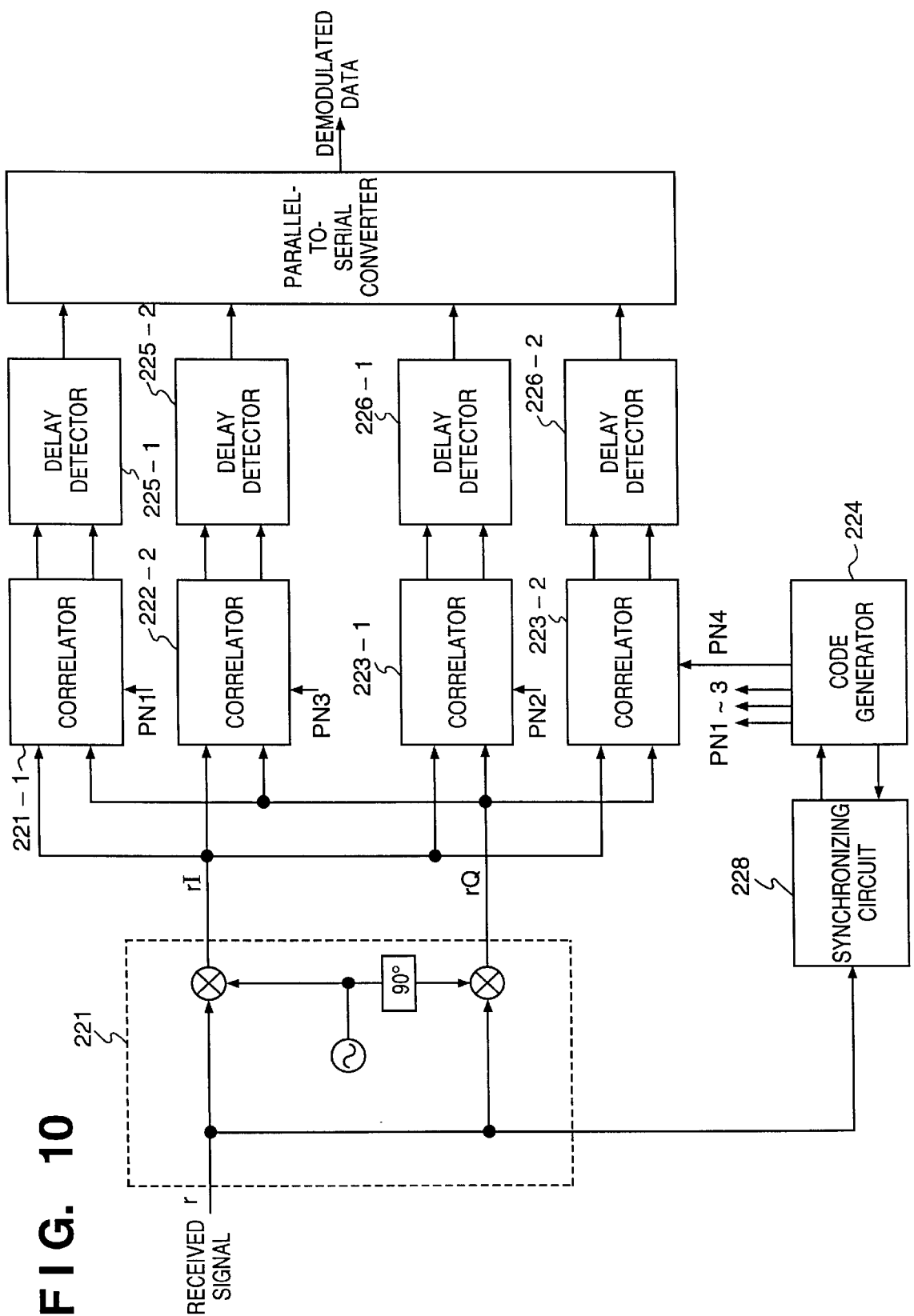

SPREAD SPECTRUM COMMUNICATION APPARATUS

BACKGROUND OF THE INVENTION

1. Field of the Invention

The present invention relates to a spread spectrum communication apparatus and method for multiplex communication using a plurality of codes.

2. Description of the Related Art

A spread spectrum communication apparatus using quadrature modulation is disclosed in U.S. Pat. No. 08/233,244 (filed on Apr. 26, 1994). In this prior art, a multiplexing method using a plurality of spread codes is described. FIG. 17 shows a transmitter, and FIG. 18 shows a receiver. In FIG. 17, transmission data is converted into parallel data #I1 to #In and #Q1 to #Qn for two channels, i.e., an in-phase channel (Ich) and a quadrature channel (Qch). Transmission data #I1 and #Q1 are spread-modulated in accordance with a common spread code $PN_1$ which is output from a code generator 84, and then subjected to quadrature modulation. These data are converted into desired frequencies and transmitted. Similarly, transmission data #I2 to #In and #Q2 to #Qn are spread-modulated in accordance with common spread codes $PN_2$ to $PN_n$, respectively, and then subjected to quadrature modulation.

Referring to FIG. 18, on the reception side, the received signal is separated into the channels Ich and Qch by using a carrier which is reproduced by a carrier reproduction circuit 91, and correlations between the received signals and the spread codes $PN_1$ to $PN_n$ which are the same as those on the transmission side are calculated by correlators 907-1 to 907-n and 908-1 to 908-n, thereby performing spread demodulation. Thereafter, a determiner 909 demodulates the data.

In the above prior art, however, the in-phase channel (Ich) data and the quadrature channel (Qch) data are spread-modulated using the common spread codes. For this reason, as in normal QPSK, a shift between quadrature axes or a phase/frequency shift in a reproduced carrier poses a serious problem. Since a highly precise quadrature and reproduced carrier are required, the apparatus can hardly be made compact, and expensive parts are necessary. Furthermore, to increase the phase/frequency precision of the reproduced carrier, the time required for carrier reproduction is prolonged. Particularly, in packet communication, the overhead becomes large, resulting in a decrease in throughput.

In the above prior art, a plurality of signals which have undergone spread modulation are linearly added and then modulated using carriers. For this reason, the amplitude variation is large, resulting in a large increase in maximum peak power with respect to the average power. In, e.g., octet-multiplexing, the maximum peak power is eight times larger (9 dB) than the average power. Therefore, the average output and communication distance become small. To ensure a predetermined communication distance, a high-power amplifier is needed, resulting in an increase in power consumption.

SUMMARY OF THE INVENTION

It is an object of the present invention to improve the reliability of spread spectrum communication.

It is another object of the present invention to realize high-speed spread spectrum communication.

It is still another object of the present invention to achieve size reduction of an apparatus for performing high-speed data transmission by spread spectrum communication.

It is a further object of the present invention to decrease the cost of an apparatus for performing high-speed data communication by spread spectrum communication.

It is an additional object of the present invention to reduce the power consumption in high-speed data communication by spread spectrum communication.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a block diagram showing the third transmission unit in the spread spectrum communication apparatus in which the present invention is practiced;

FIG. 10 is a block diagram showing the fourth reception unit in the spread spectrum communication apparatus in which the present invention is practiced;

DETAILED DESCRIPTION OF THE PREFERRED EMBODIMENTS

Figure 1:
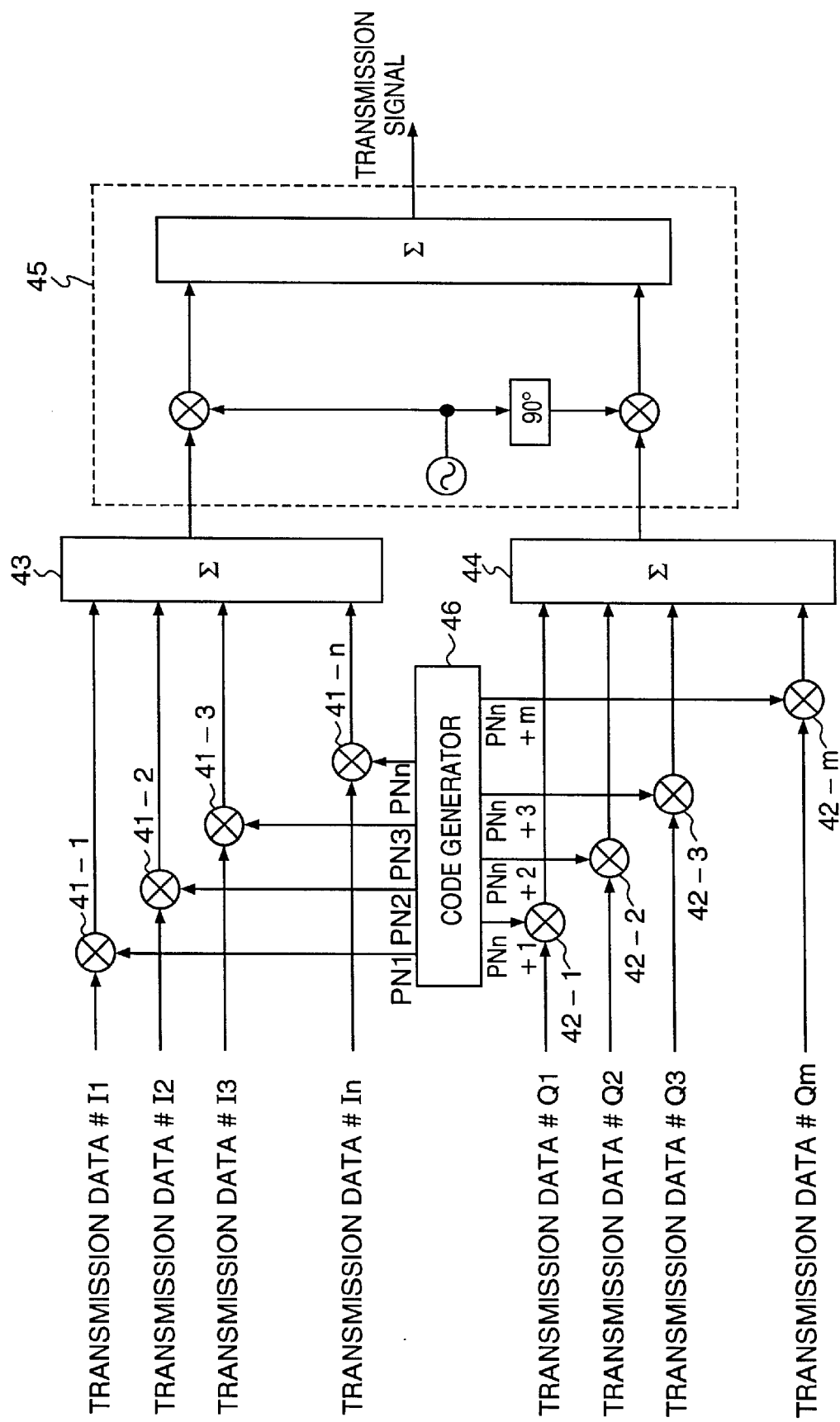
FIG. 1 is a block diagram showing the first transmission unit in a spread spectrum communication apparatus of the present invention.
Figure 2:
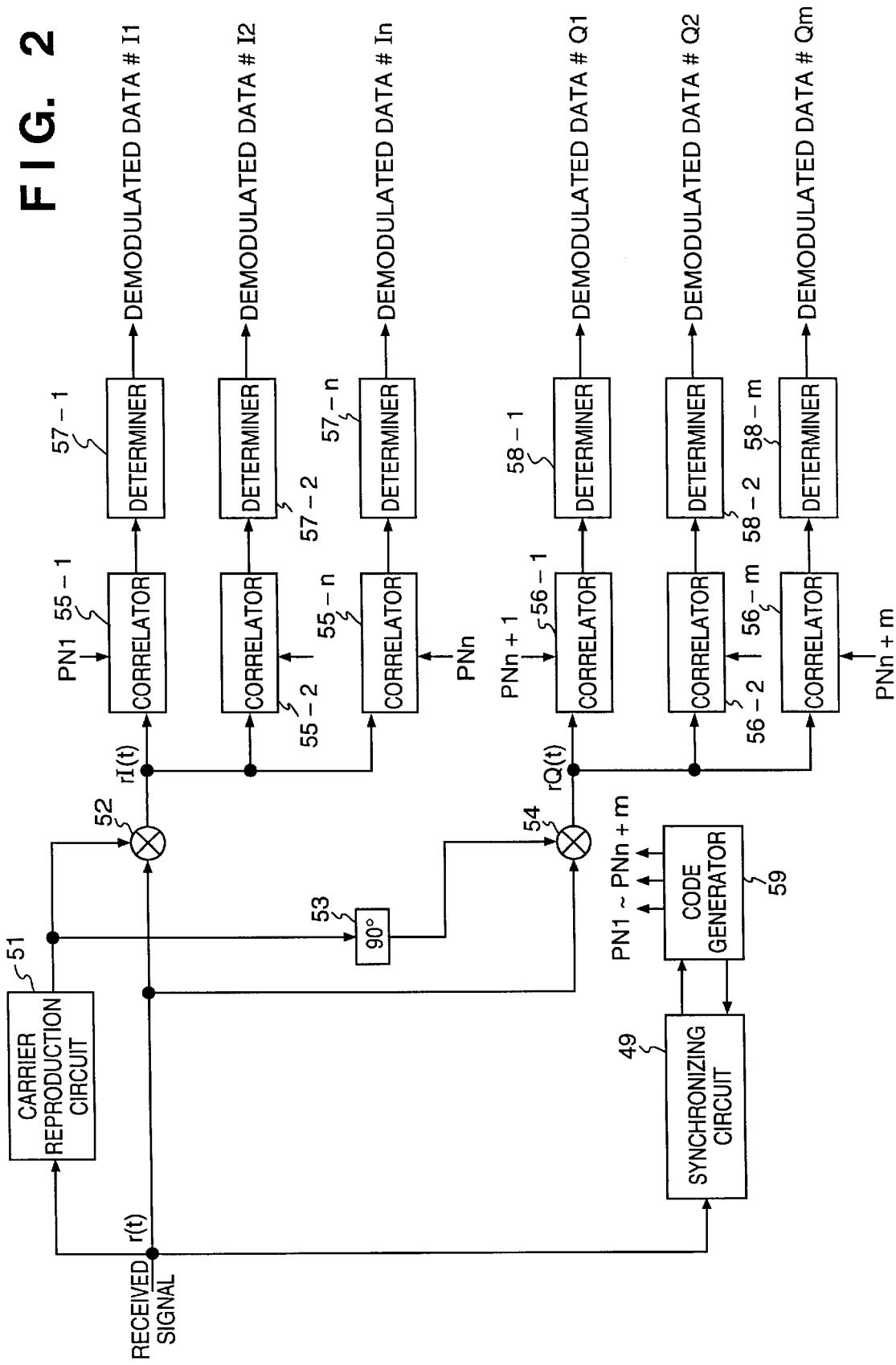
FIG. 2 is a block diagram showing the first reception unit in the spread spectrum communication apparatus of the present invention.

An embodiment will now be described in which both an in-phase component and a quadrature component are multiplexed using a plurality of quadrature codes $PN_1$ to $PN_{n+m}$. FIGS. 1 and 2 are block diagrams showing the first transmission and reception units, respectively.

Referring to FIG. 1, of n+m parallel data, n data #I1 to #In (in-phase channel data) are spread-modulated, by spread modulators 41-1 to 41-n, in accordance with spread codes $PN_1$ to $PN_n$ of n+m spread codes $PN_1$ to $PN_{n+m}$ which are output from a code generator 46, respectively, and added by a first adder 43. M remaining data #Q1 to #Qm (quadrature channel data) are spread-modulated, by spread modulators 42-1 to 42-m, in accordance with the m spread codes $PN_{n+m}$ to $PN_{n+m}$ which are output from the code generator 46 and added by a second adder 44. An output from the first adder 43 and an output from the second adder 44 are input to a quadrature modulator 45, modulated with quadrature carriers, and synthesized. A signal output from the quadrature modulator 45 is subjected to amplification, filtering, or frequency conversion, as needed, and transmitted.

In FIG. 2, a received signal r(t) is subjected to amplification, filtering, or frequency conversion, as needed, and then branched. Part of the received signal is input to a carrier reproduction circuit 51, so that a carrier is extracted and output. Part of the received signal is input to a synchronizing circuit 49, so that clock synchronization and code synchronization between the received signal and spread codes generated by a code generator 59 are established. As the synchronizing circuit 49, a sliding correlator, a delay lock loop, or a circuit using a surface acoustic wave device described in, e.g., U.S. Pat. No. 5,260,969 (Kato et al.), U.S. Ser. No. 08/233,244 (filed on Apr. 26, 1994), U.S. Ser. No. 08/546,040 (filed on Oct. 20, 1995), or Japanese Patent Laid-Open No. 8-167864 can be used. Part of the received signal is further branched into two components. One component is input to a first baseband conversion circuit 52 together with the carrier output from the carrier reproduction circuit 51, so that a baseband signal $r_I(t)$ as an in phase component is extracted. The other component is input to a second baseband conversion circuit 54 together with a signal which is obtained by phase-shifting the carrier output from the carrier reproduction circuit 51 by 90° by a 90° phase shifter 53, so that a baseband signal $r_Q(t)$ as a quadrature component is extracted. The baseband signal $r_I(t)$ as an in-phase component is further branched into n components. N correlators 55-1 to 55-n perform correlation calculation between these components and the n spread codes $PN_1$ to $PN_n$ of the n+m spread codes $PN_1$ to $PN_{n+m}$ which are output from the code generator 59. The data is demodulated by determiners 57-1 to 57-n on the basis of the correlation results. M correlators 56-1 to 56-m perform correlation calculation between the baseband signal $r_Q(t)$ as a quadrature component and the m spread codes $PN_{n+1}$ to $PN_{n+m}$ of the spread codes which are output from the code generator 59. The data are demodulated by determiners 58-1 to 58-m on the basis of the correlation results.

In this embodiment, the n+m spread codes are preferably quadrature codes. However, a set of codes having very small cross-correlation values except 0 may be used. If the in-phase channel spread codes $PN_1$ to $PN_n$ are quadrature codes or have small cross-correlation values, and the quadrature channel spread codes $PN_{n+1}$ to $PN_{n+m}$ are quadrature codes or have small cross-correlation values, the in-phase channel spread codes $PN_1$ to $PN_n$ and the quadrature channel spread codes $PN_{n+1}$ to $PN_{n+m}$ may have relatively large cross-correlation values. In addition, m may equal n.

In this embodiment, n+m parallel data are transmitted. When a serial-to-parallel converter is arranged on the transmission side, and a parallel-to-serial converter is arranged on the reception side, high-speed data transmission is enabled.

In this embodiment, the carrier reproduction circuit 51 reproduces the carrier from the received signal. However, the signal may be fed back from the correlators 55 and 56.

Figure 3:
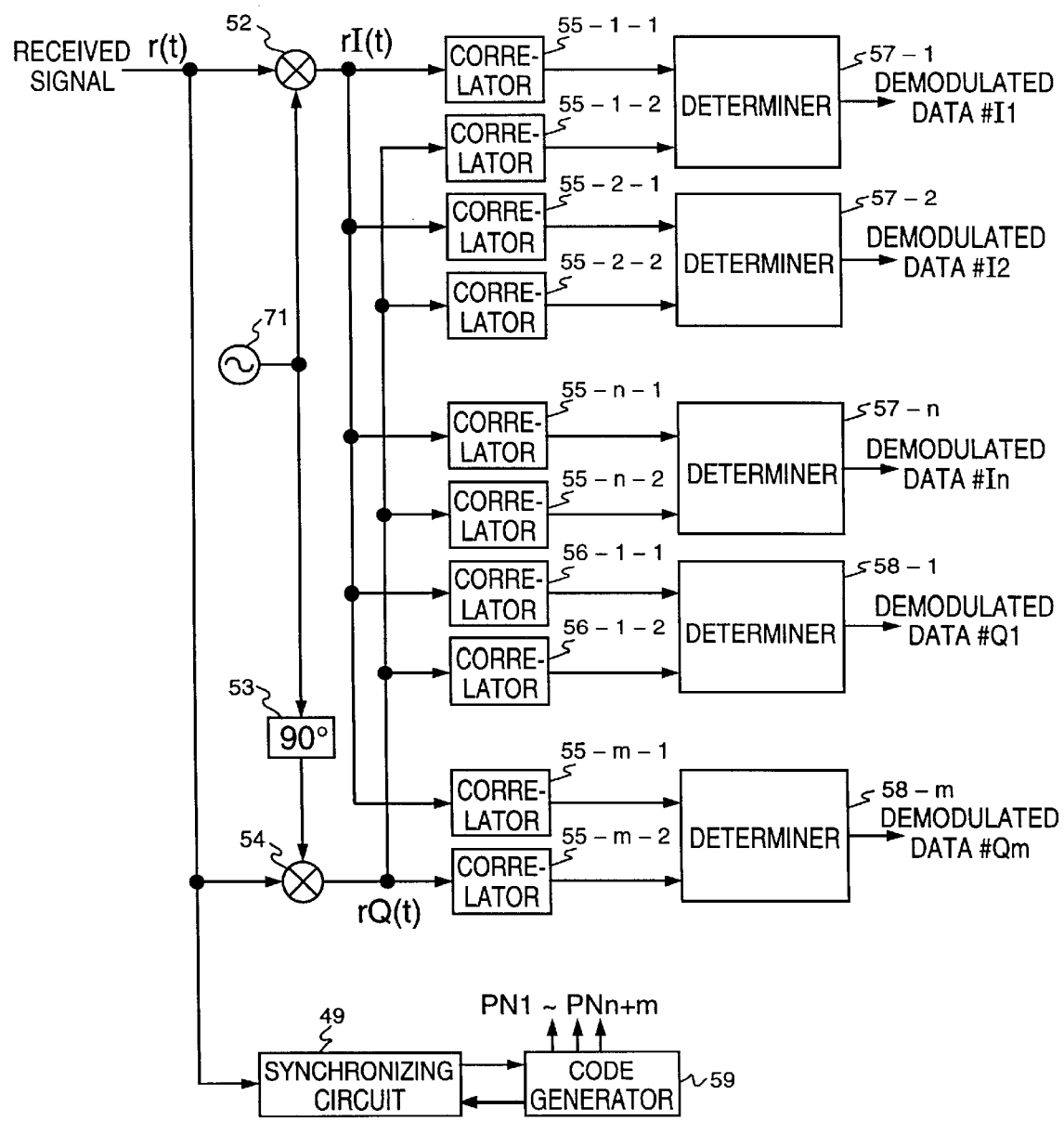
FIG. 3 is a block diagram showing the second reception unit in the spread spectrum communication apparatus of the present invention.

A case in which no carrier is reproduced in the reception unit will be described next. The arrangement of the transmission unit is the same as in FIG. 1. FIG. 3 is a block diagram of the second reception unit in the spread spectrum communication apparatus in which the present invention is practiced. The same reference numerals as in FIG. 2 denote the same constituent elements in FIG. 3. In this reception unit, carrier reproduction is not performed. Instead, the received signal is converted into a quasi-baseband signal in accordance with an output from an oscillator 71, which has almost the same frequency as the transmission frequency or an intermediate frequency obtained upon frequency conversion of the received signal, and demodulated.

Referring to FIG. 3, the output signal from the oscillator 71 has almost the same frequency as that of the received signal, though the phases do not coincide. Therefore, outputs $r_I$ and $r_Q$ from baseband conversion circuits 52 and 54 are represented as follows:

$$r_I = t_I \cos\alpha + t_Q \sin\alpha$$

$$r_Q = -t_I \sin\alpha + t_Q \cos\alpha$$

where $t_I$ and $t_Q$ are the in-phase and quadrature components of the transmission signal, and $\alpha$ is the phase difference between the output from the oscillator 71 and the received signal.

The outputs $r_I$ and $r_Q$ from the baseband conversion circuits 52 and 54 are input to correlators 55-11 and 55-12 for the spread code $PN_1$ and correlated with the spread code $PN_1$ which is synchronized with the received signal. The spread code $PN_1$ and the spread codes $PN_2$ to $PN_{n+m}$ are quadrature codes or have small cross-correlation values. For this reason, the quadrature component of the transmission signal and components obtained by spread modulation according to the remaining spread codes $PN_2$ to $PN_n$, as in-phase components, are suppressed from the outputs from the correlators 55-11 and 55-12, and $\cos\alpha$ and $\sin\alpha$ of the correlation value of a component which has undergone spread modulation according to the spread code $PN_1$ are extracted. Therefore, when these $\cos\alpha$ and $\sin\alpha$ are input to a determiner 57-1, transmission data #I1 is demodulated. In a similar manner, the remaining parallel data is demodulated.

The synchronizing circuit 49 is operated with a signal before conversion into a baseband signal. However, the synchronizing circuit 49 may be operated with a baseband signal.

Instead of making one spread code correspond to 1-bit transmission data, a set of spread codes may be made to correspond to a plurality of data, i.e., parallel composition may be used.

Figure 4:
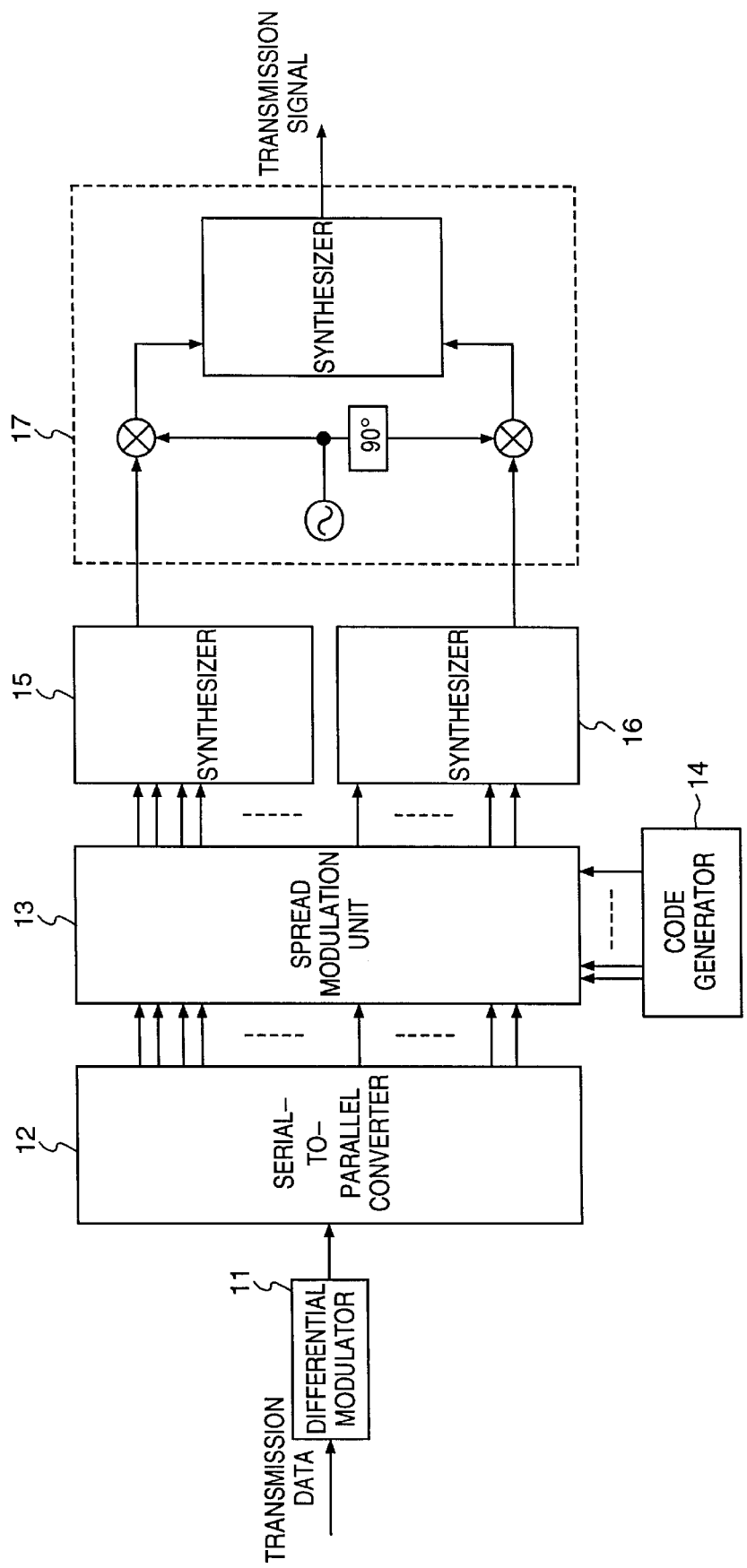
FIG. 4 is a block diagram showing the second transmission unit in the spread spectrum communication apparatus in which the present invention is practiced.

FIG. 4 is a block diagram of the second transmission unit in the spread spectrum communication apparatus in which the present invention is practiced. In FIG. 4, reference numeral 11 denotes a differential modulator for differentially encoding transmission data; 12, a serial-to-parallel converter for converting input data into a plurality of parallel data; 13, a spread modulation unit for spread-modulating a plurality of input signals in accordance with different spread codes $PN_1$ to $PN_{n+m}$ corresponding to the input signals; 14, a code generator for generating the plurality of spread codes $PN_1$ to $PN_{n+m}$; 15 and 16, first and second synthesizers for adding and synthesizing the plurality of signals; and 17, a quadrature modulator for synthesizing two input signals on carriers having quadrature phases.

Figure 6:
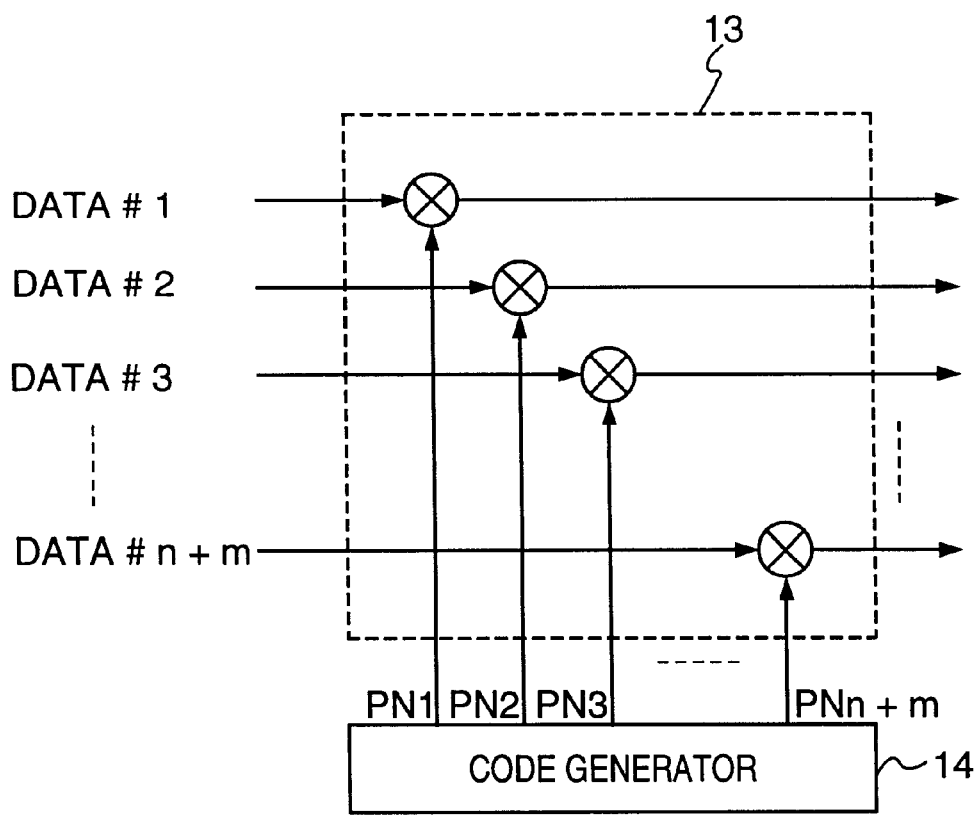
FIG. 6 is a block diagram showing a spread modulation unit in the second transmission unit of the spread spectrum communication apparatus in which the present invention is practiced.

The operation of this transmission unit will be described with reference to FIG. 4. Transmission data is differentially encoded by the differential modulator 11 and then converted into a plurality of parallel data by the serial-to-parallel converter 12. Spread modulation of the parallel data is performed by the spread modulation unit 13 in accordance with the different spread codes $PN_1$ to $PN_{n+m}$ which are output from the code generator 14. The spread modulation unit 13 has an arrangement shown in FIG. 6. More specifically, n+m input data #1, #2, . . . , #n+m are spread-modulated by signal processing such as multiplication or EX-OR (exclusive-OR) in correspondence with the n+m spread codes $PN_1$, $PN_2$, . . . , $PN_{n+m}$ which are output from the code generator 14.

Some of outputs from the spread modulation unit 13 are added and synthesized by the first synthesizer 15. The remaining outputs from the spread modulation unit 13 are added and synthesized by the second synthesizer 16. Outputs from the first synthesizer 15 and the second synthesizer 16 are superimposed on quadrature carriers and synthesized by the quadrature modulator 17. The resultant signal is converted into a desired frequency by a high-frequency unit (not shown), subjected to amplification, filtering, or the like, and transmitted.

Figure 5:
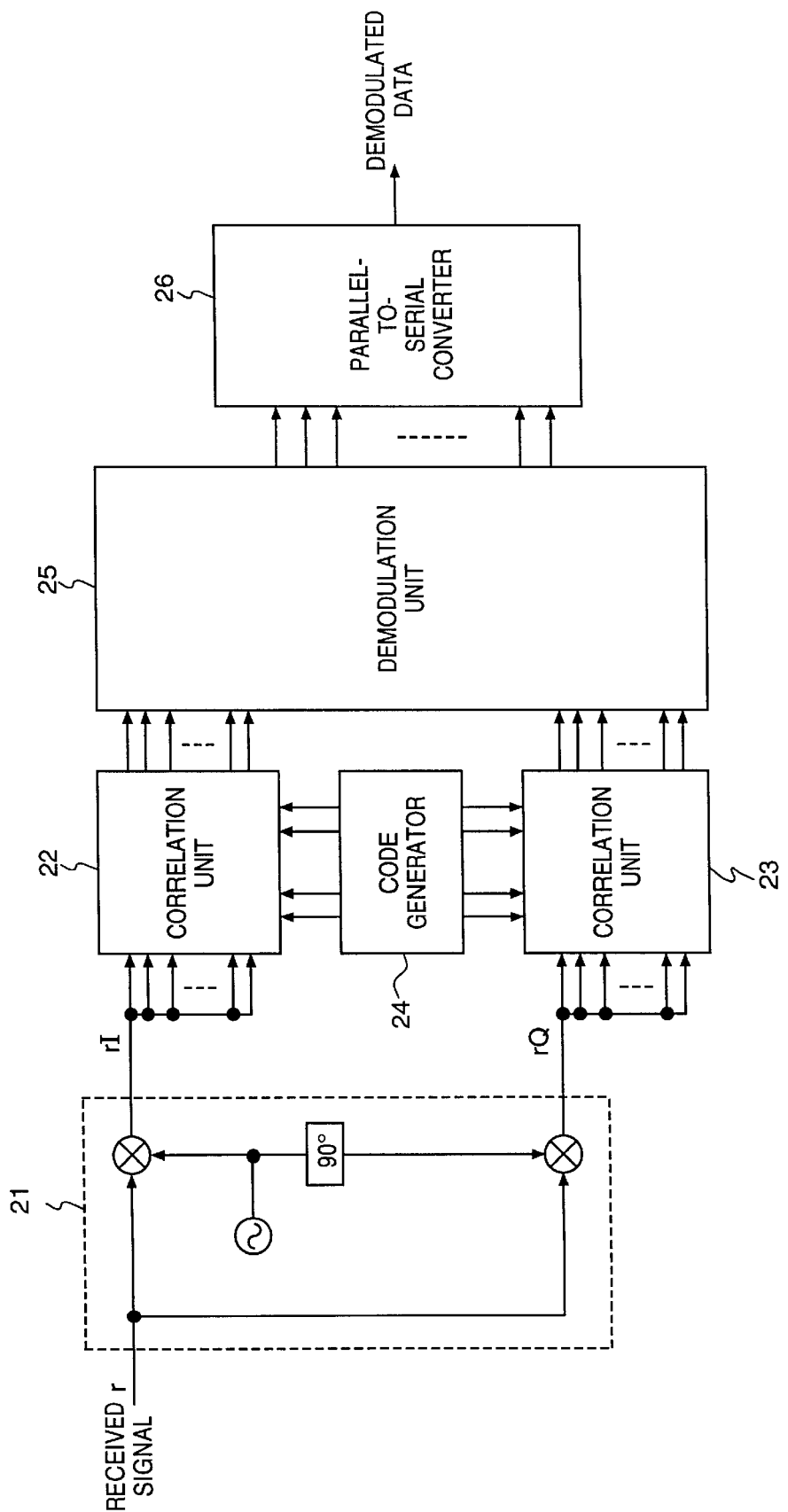
FIG. 5 is a block diagram showing the third reception unit in the spread spectrum communication apparatus in which the present invention is practiced.

FIG. 5 is a block diagram of the third reception unit in the spread spectrum communication apparatus in which the present invention is practiced, which corresponds to the second transmission unit shown in FIG. 4. Referring to FIG. 5, reference numeral 21 denotes a frequency converter for converting a received signal into two quadrature baseband signals. The frequency converter 21 is constituted by an oscillator, a mixer, a filter, and a phase shifter for shifting an output from the oscillator by 90°. Reference numerals 22 and 23 denote correlation units for calculating correlations between the received signal and output signals $PN_1$ to $PN_{n+m}$ from a code generator 24; 24, a code generator for generating the desired spread codes $PN_1$ to $PN_{n+m}$ in synchronism with the received signal; 25, a demodulation unit for demodulating data upon receiving a correlation output; and 26, a parallel-to-serial converter for converting parallel data into serial data.

The operation will be described with reference to FIG. 5. The received signal is subjected to amplification, filtering, or the like by a high-frequency unit (not shown). A received signal r having an unprocessed input frequency or an intermediate frequency after conversion is input to the frequency converter 21. The frequency converter 21 outputs the two quadrature baseband signals $r_I$ and $r_Q$. Each of the two baseband signals $r_I$ and $r_Q$ is branched into a desired number of components. Correlations between these components and the spread codes which are output from the code generator 24 are calculated by the correlation units 22 and 23, so that correlation values corresponding to the signals $r_I$ and $r_Q$ are output. The outputs from the correlation units 22 and 23 are input to the demodulation unit 25. The demodulation unit 25 performs phase comparison between correlation outputs corresponding to two continuous signals which are input to the serial-to-parallel converter 12 on the transmission side and demodulates the data. The parallel data demodulated by the demodulation unit 25 is converted into serial data by the parallel-to-serial converter 26 and output.

Figure 7:
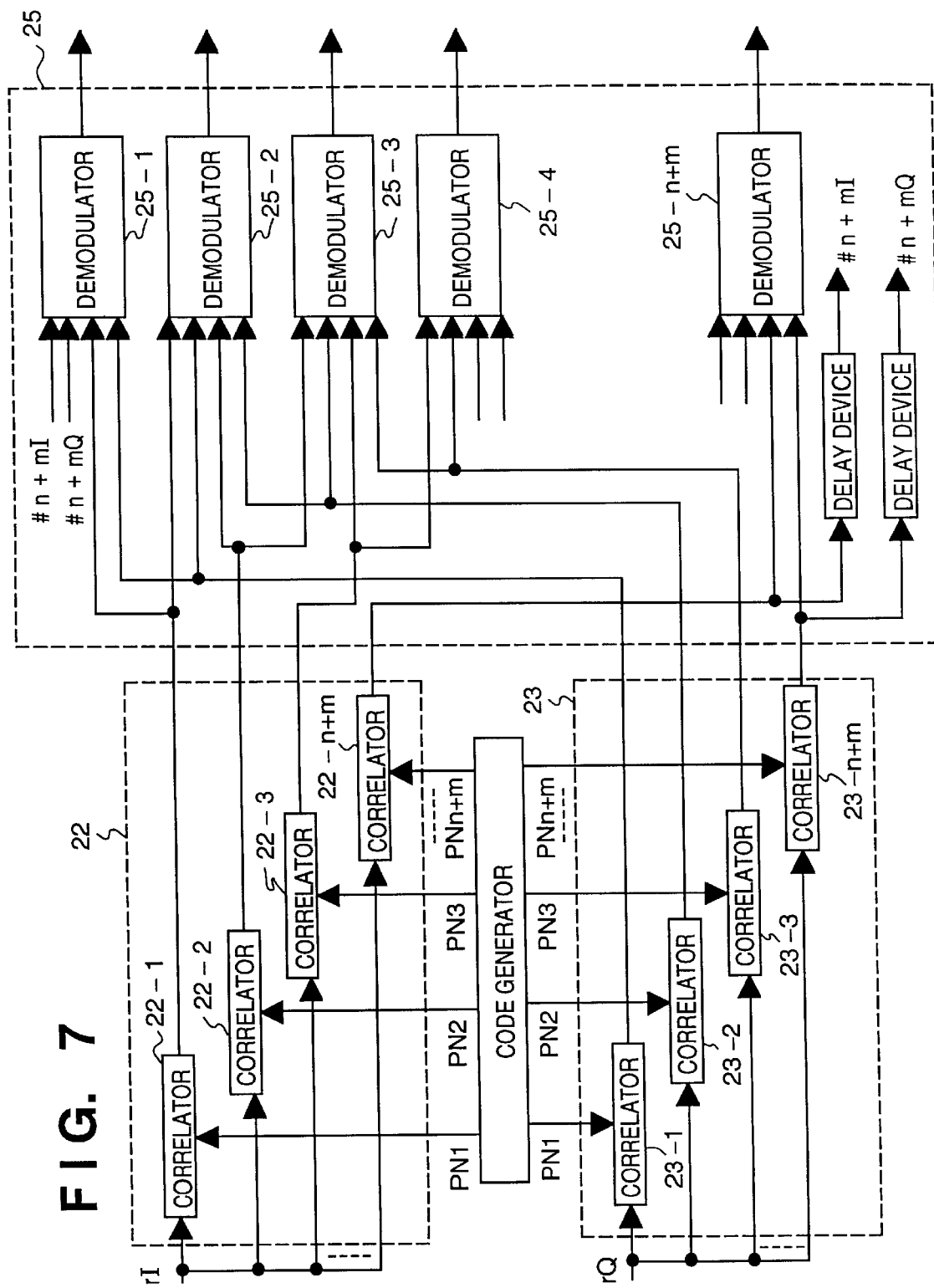
FIG. 7 is a block diagram showing the details of a correlation unit and a demodulation unit in the third reception unit of the spread spectrum communication apparatus of the present invention.

The operation will be described in more detail with reference to FIG. 7. Each of the two quadrature received signals $r_I$ and $r_Q$ which are converted into baseband signals by the frequency converter 21 is branched into a desired number of components, i.e., n components and input to the correlation units 22 and 23. The correlation unit 22 is constituted by n+m correlators 22-1, 22-2, . . . , 22-n+m which calculate correlations between the received signal $r_I$ and the spread codes $PN_1$, $PN_2$, . . . , $PN_{n+m}$ synchronized with the received signal, which are the same as those output from the code generator 24 and used for spread modulation on the transmission side. If the n+m spread codes are quadrature codes, components modulated according to other spread codes are removed from the correlation outputs, and only a component modulated according to the corresponding spread code is extracted. In a similar manner, the correlation unit 23 is constituted by n+m correlators 23-1, 23-2, . . . , 23-n+m which calculate correlations between the received signal $r_I$ and the spread codes $PN_1$, $PN_2$, . . . , $PN_{n+m}$ synchronized with the received signal, which are the same as those output from the code generator 24 and used for spread modulation on the transmission side. Only a component modulated according to the corresponding spread code is extracted.

Since the outputs from the correlation units 22 and 23 are quadrature components, the phases of the outputs from the correlators are represented by these outputs. In addition, since the outputs from the correlators correspond to signals which are differentially encoded on the transmission side, the data can be demodulated by comparing the phases of correlation outputs corresponding to two continuous signals input to the serial-to-parallel converter 12 on the transmission side. More specifically, a demodulator 25-2 compares the phase represented by outputs from the correlators 22-1 and 23-1 with the phase represented by outputs from the correlators 22-2 and 23-2, and the data is determined on the basis of the phase difference. When the signal modulated in accordance with the spread code $PN_1$ and the signal modulated in accordance with the spread code $PN_2$ on the transmission side are connected to the same input terminal of the quadrature modulator 17, the data is determined depending on whether the phase difference is 0 rad or $\pi$ rad. When the signal modulated in accordance with the spread code $PN_1$ and the signal modulated in accordance with the spread code $PN_2$ on the transmission side are connected to different input terminals of the quadrature modulator 17, the data is determined depending on whether the phase difference is $\pi/2$ rad or $3\pi/2$ rad.

In a similar manner, a demodulator 25-3 compares a phase represented by outputs from the correlators 22-2 and 23-2 with a phase represented by outputs from the correlators 22-3 and 23-3, and data is determined on the basis of the phase difference. A demodulator 25-n+m compares a phase represented by outputs from correlators 22-(n+m−1) and 23-(n+m−1) with a phase represented by outputs from correlators 22-n+m and 23-n+m, and data is determined on the basis of the phase difference. The demodulator 25-1 also compares the phase represented by outputs from the correlators 22-1 and 23-1 with a phase represented by outputs which are obtained by delaying outputs from the correlators 22-n+m and 23-n+m by one data symbol, and data is determined on the basis of the phase difference.

As described above, when two continuous signals input to the serial-to-parallel converter 12 on the transmission side are connected to the same input terminal of the quadrature modulator 17, the demodulation unit 25 determines data depending on whether the phase difference is 0 rad or π rad. When the two continuous signals are input to different input terminals of the quadrature modulator 17, data is determined depending on whether the phase difference is π/2 rad or 3π/2 rad. Therefore, even when components modulated according to other spread codes leak to a correlation output because of distortion in transmission line or a shift in synchronization due to a degradation in S/N ratio, the influence can be suppressed.

Figure 8:
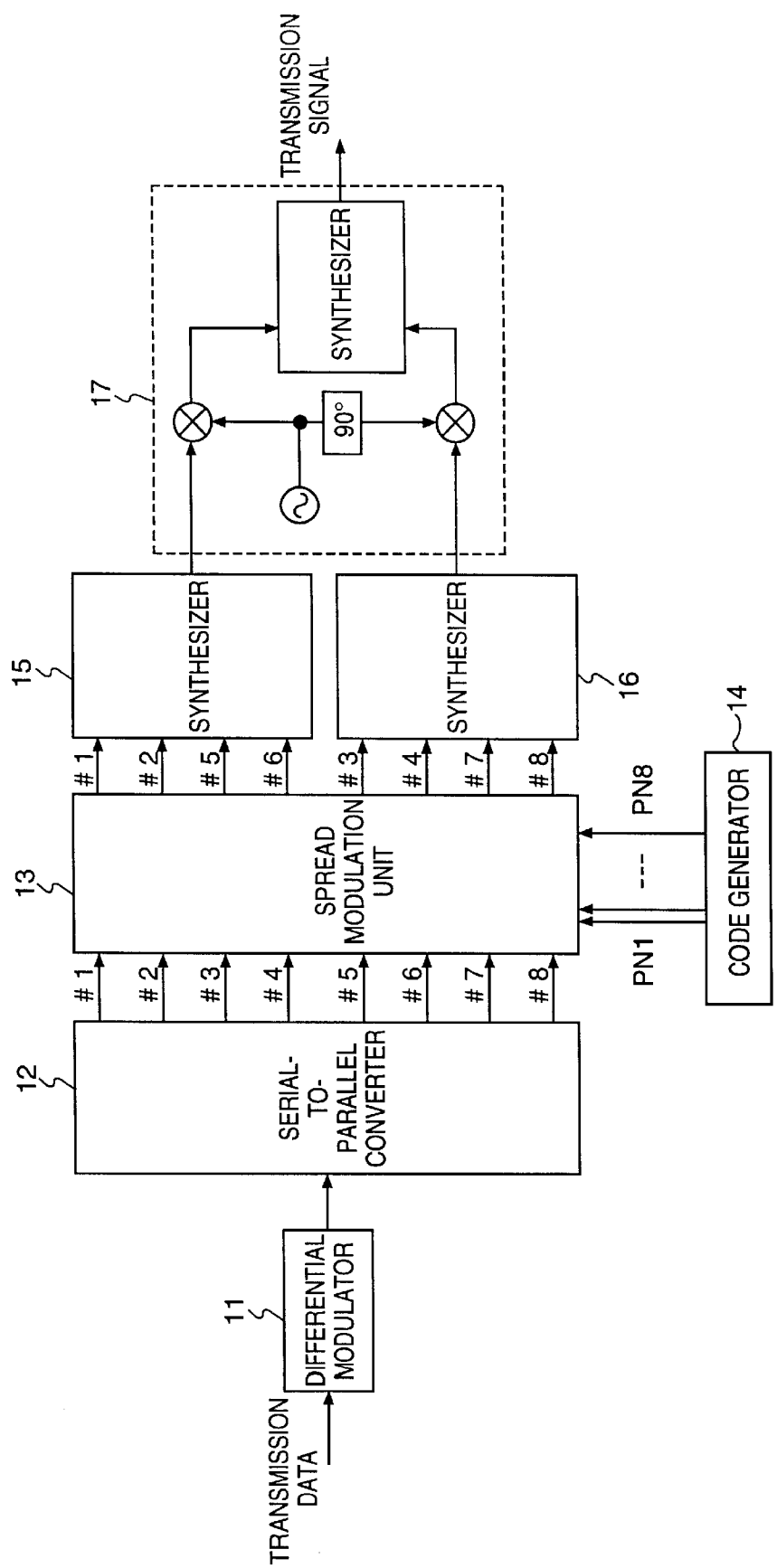
FIG. 8 is a block diagram showing the second transmission unit for octet-multiplexing in the spread spectrum communication apparatus of the present invention.

FIG. 8 shows an example of octet-multiplexing. The same reference numerals as in FIG. 4 denote the same parts in FIG. 8.

Referring to FIG. 8, transmission data is differentially encoded by the differential modulator 11, converted into eight parallel data #1, #2, #3, . . . , #8 by the serial-to-parallel converter 12, and spread-modulated by the spread modulation unit 13 in accordance with the different codes $PN_1$, $PN_2$, $PN_3$, . . . , $PN_8$ which are output from the code generator 14. More specifically, data #1 is spread-modulated in accordance with the spread code $PN_1$, data #2 is spread-modulated in accordance with the spread code $PN_2$, data #3 is spread-modulated in accordance with the spread code $PN_3$, and data #8 is spread-modulated in accordance with the spread code $PN_8$. Outputs #1, #2, #5, and #6 from the spread modulation unit 13 are added and synthesized by the first synthesizer 15, and outputs #3, #4, #7, and #8 are added and synthesized by the second synthesizer 16. These data are subjected to quadrature modulation by the quadrature modulator 17 and transmitted.

In FIG. 5, on the reception side, the correlation unit 22 outputs R1I, R2I, R3I, . . . , R8I as the results of correlation calculation between the received data and the spread codes $PN_1$, $PN_2$, $PN_3$, . . . , $PN_8$, and the correlation unit 23 outputs R1Q, R2Q, R3Q, . . . , R8Q as the results of correlation calculation between the received data and the spread codes $PN_1$, $PN_2$, $PN_3$, . . . , $PN_8$. The demodulation unit 25 demodulates the data by determining on the basis of R1I, R1Q, R2I, and R2Q whether the phase difference is 0 rad or π rad. The demodulation unit 25 also demodulates the data by determining on the basis of R2I, R2Q, R3I, and R3Q whether the phase difference is π/2 rad or 3π/2 rad. In a similar manner, the demodulators 25-2, 25-3 , . . . , 25-8 shown in FIG. 7 demodulate the data. The demodulator 251 also demodulates the data by determining on the basis of R8I, R8Q, R1I, and R1Q, which are delayed by one data symbol, whether the phase difference is π/2 rad or 3π/2 rad.

Octet-multiplexing has been described above. However, the number of data to be multiplexed is not limited to eight.

In addition, when a baseband signal is analog/digital-converted, the subsequent processing can be performed as digital processing.

In the above example, serial data is converted into a plurality of parallel data by the serial-to-parallel converter 12 and transmitted. However, the present invention is not limited to this, and parallel data may be transmitted without using any serial-to-parallel converter.

FIGS. 9 and 10 are block diagrams showing the third transmission unit and the fourth reception unit in the spread spectrum communication apparatus in which the present invention is practiced, respectively. A case in which transmission data is converted into four parallel data and multiplexed will be described below.

Figure 11A:
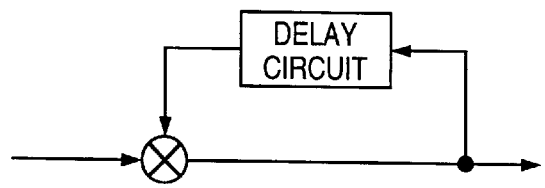
FIGS. 11A and 11B are block diagrams showing the arrangements of a differential binary phase shift keying modulator.
Figure 11B:
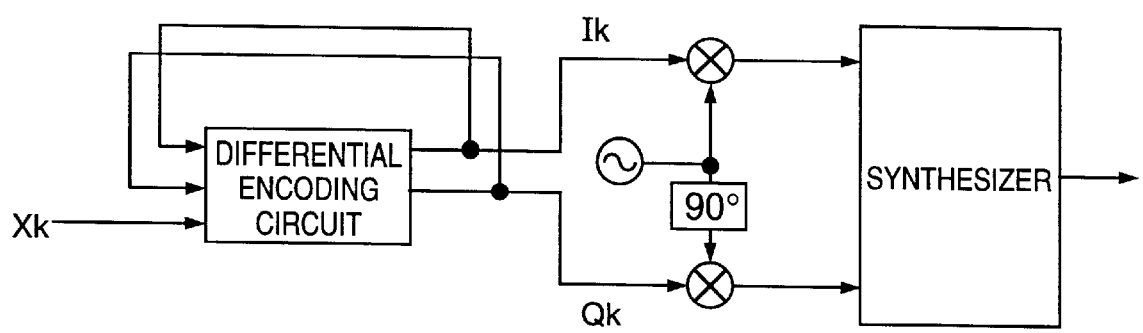

Referring to FIG. 9, transmission data is converted into four parallel data by a serial-to-parallel converter 111, and the respective data are differentially modulated by first and second DBPSK (differential binary phase shift keying) modulators 112-1 and 112-2 and first and second π/2 DBPSK (π/2 differential phase shift keying) modulators 113-A and 113-B. In differential binary phase shift keying, if data to be transmitted is the same as the previous data, 0 rad is made to correspond to the data; otherwise, π rad is made to correspond to the data. In π/2 differential phase shift keying, the phase is advanced or delayed by π/2 depending on whether data to be transmitted is the same or different. FIG. 11A is a block diagram showing the arrangement of the DBPSK modulator, and FIG. 11B is a block diagram showing the arrangement of the π/2 DBPSK modulator. In FIG. 11B, $I_K = I_{K-1} \cos((X_K + \frac{1}{2})\pi) - Q_{K-1} \sin((X_K + \frac{1}{2})\pi)$, and $Q_K = I_{K-1} \sin((X_K + \frac{1}{2})\pi) - Q_{K-1} \cos((X_K + \frac{1}{2})\pi)$.

As shown in FIG. 9, in this transmission unit, outputs from the DBPSK modulators 112-1 and 112-2 and the π/2 DBPSK modulators 113-A and 113-B are spread-modulated by spread modulators 114-1, 114-2, 115-A, and 115-B, respectively. Synthesizers 117-1 and 117-2 and a quadrature modulator 118 synthesize the outputs from the spread modulators 114-1 and 114-2 such that the carriers have quadrature phases and also synthesize the outputs from the spread modulators 115-A and 115-B such that the carriers have quadrature phases. With this processing, the powers of the quadrature components are balanced, and the peak power can be suppressed. Therefore, the amplifier and the like on the transmission side can be effectively used. Note that the initial phases of the spread modulators 115-A and 115-B are shifted by π/2. More specifically, when $I_0=1$ and $Q_0=0$ are set in the spread modulator 115-A, $I_0=0$ and $Q_0=1$ are set in the spread modulator 115-B. With this arrangement, the peak power can be suppressed.

The spread modulators 115-A and 115-B may be arranged in correspondence with each of the I channels and Q channels of the π/2 DBPSK modulators 113-A and 113-B. Alternatively, a common spread modulator may be arranged for the I channel and Q channel. Whether an output from the common spread modulator is supplied to the synthesizer 117-1 or 117-2 may be switched on the basis of outputs from the π/2 DBPSK modulators 113-A and 113-B.

Outputs from the synthesizers 117-1 and 117-2 are converted into desired frequencies by a high-frequency unit (not shown), subjected to amplification, filtering, or the like, and transmitted. Note that the spread codes $PN_1$ to $PN_4$ shown in FIG. 9 are quadrature codes or almost quadrature codes.

On the reception side, the received signal r having an unprocessed input frequency or an intermediate frequency after conversion, which has undergone amplification, filtering, or the like by the high-frequency unit (not shown), is input to a frequency converter 221.

In FIG. 10, the received signal is converted into the two quadrature baseband signals $r_I$ and $r_Q$ by the frequency converter 221. Each of the signals $r_I$ and $r_Q$ is branched into four components, and correlations between the four components and the different spread codes $PN_1$, $PN_2$, $PN_3$, and $PN_4$ which are output from a code generator 224 are calculated by four correlators 222-1, 222-2, 223-1, and 223-2, respectively. Signals extracted by correlation calculation are demodulated by delay detectors 225-1, 225-2, 226-1, and 226-2 and converted into serial data by a parallel-to-serial converter 227. Reference numeral 228 denotes a synchronizing circuit for establishing synchronization between the spread codes $PN_1$ to $PN_4$ output from the code generator 224 and the received signal.

In this reception unit, since differential encoding is performed on the transmission side, the data can be demodulated from the delay detection signals with a simple arrangement.

In FIGS. 9 and 10, the serial data is converted into four parallel data and multiplexed. However, a larger number of parallel data may be multiplexed. More specifically, of N parallel data, N1 data is subjected to DBPSK modulation, and the remaining N2 data is subjected to $\pi/2$ DBPSK modulation. This data is spread-modulated in accordance with N different spread codes, synthesized, and transmitted. On the reception side, the data is correlated with the N spread codes which are the same as those on the transmission side, and delay detection is performed. With this processing, the N parallel data are demodulated, and these data can be converted into serial data by the parallel-to-serial converter. Of the N spread codes, N1 spread codes used for spread modulation of the DBPSK-modulated signals are preferably quadrature codes or almost quadrature codes, and the remaining N2 spread codes are also preferably quadrature codes or almost quadrature codes. More preferably, all of the N spread codes are quadrature codes or almost quadrature codes.

Though not particularly specified in the above description, when a baseband signal is analog/digital-converted, the subsequent processing can be performed as digital processing.

Assume that N1 data is divided into N1A data and N1B data and transmitted on quadrature carriers, and N2 data is divided into N2A data and N2B data and transmitted on quadrature carriers. If the numbers of data, i.e., N1A and N1B, or N2A and N2B are equal or have a difference of one, the powers of the quadrature components are balanced, and the peak power can be suppressed.

Figure 12:
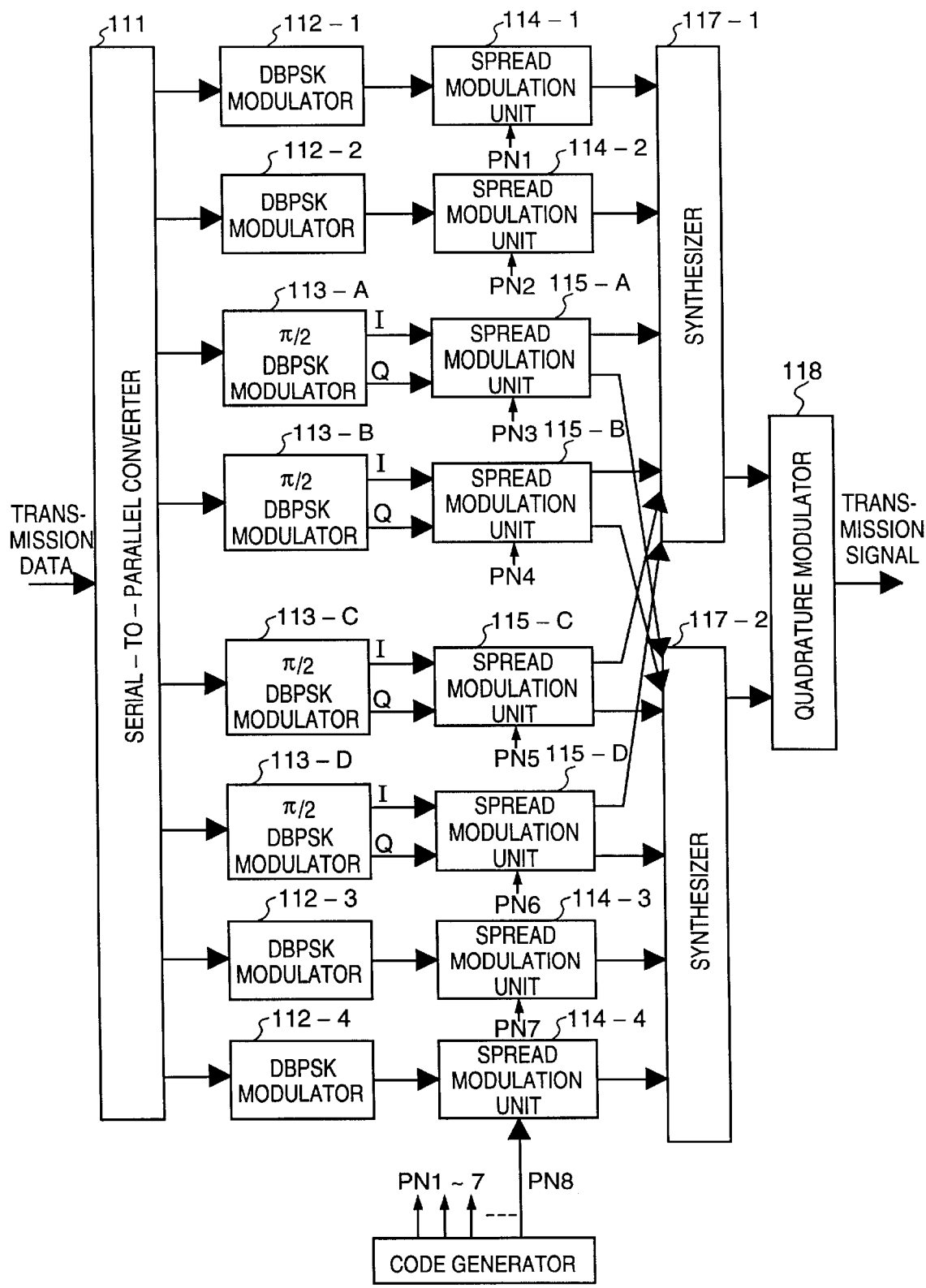
FIG. 12 is a block diagram showing the third transmission unit for octet-multiplexing in the spread spectrum communication apparatus in which the present invention is practiced.

FIG. 12 is a block diagram showing the arrangement of a transmission unit for octet-multiplexing. The initial phases of half of $\pi/2$ DBPSK modulators 113-A to 113-D are shifted by $\pi/2$. More specifically, when $I_0=1$ and $Q_0=0$ are set in the $\pi/2$ DBPSK modulators 113-A and 113-B, $I_0=0$ and $Q_0=1$ are set in the $\pi/2$ DBPSK modulators 113-C and 113-D.

In the above description, serial data is converted into a plurality of parallel data by the serial-to-parallel converter 111 and transmitted. However, the present invention is also effectively applied to an arrangement without any serial-to-parallel converter, i.e., parallel data transmission.

Figure 13:
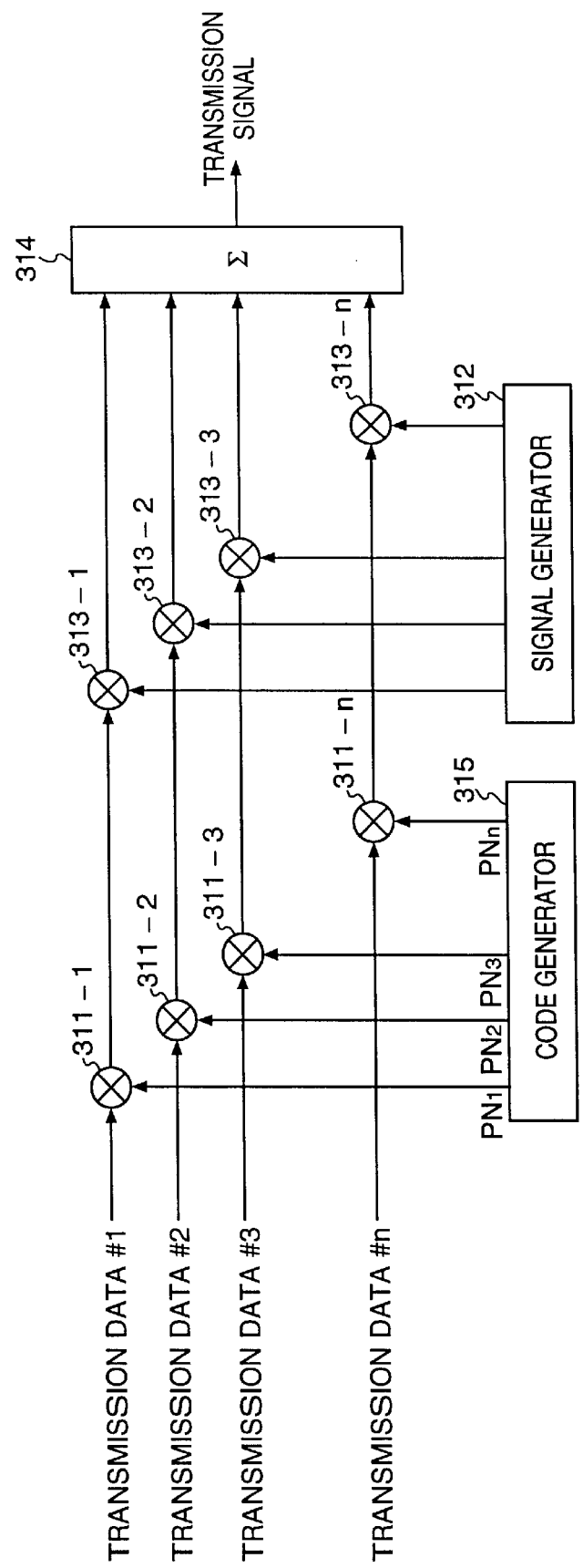
FIG. 13 is a block diagram showing the fourth transmission unit in the spread spectrum communication apparatus in which the present invention is practiced.

FIG. 13 is a block diagram showing the schematic arrangement of the fourth transmission unit in the spread spectrum communication apparatus of the present invention. Referring to FIG. 13, reference numerals 311-1 to 311-n denote spread modulators for spread-modulating transmission data in accordance with spread codes; 312, a signal generator for generating n carriers having different phases; 313-1 to 313-n, modulators for modulating the output carriers from the signal generator 312 in accordance with outputs from the spread modulators 311-1 to 311-n; 314, a synthesizer for synthesizing outputs from the modulators 313-1 to 313-n; and 315, a code generator for generating the spread codes.

In FIG. 13, n transmission data #1 to #n are spread-modulated by the spread modulators 311-1 to 311-n in accordance with the n spread codes $PN_1$ to $PN_n$ which are output from the code generator 315. Outputs from the spread modulators 311-1 to 311-n are input to the modulators 313-1 to 313-n and phase-modulated in accordance with n carriers having different phases, which are output from the signal generator 312, respectively. The synthesizer 314 synthesizes the n signals and outputs the synthesized signal. The signal output from the synthesizer 314 is subjected to amplification, filtering, frequency conversion, or the like, as needed, and transmitted.

Figure 16:
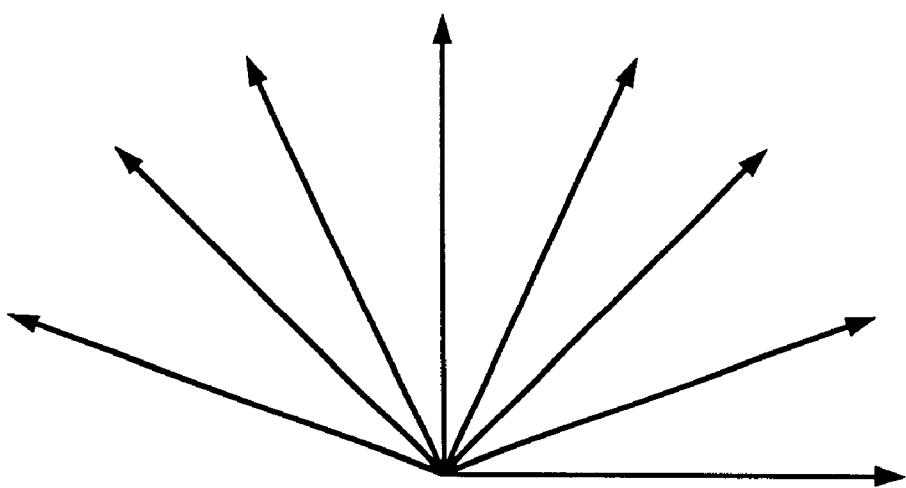
FIG. 16 is a view showing an example of the phase of a carrier which is output from a signal generator.
Figure 17:
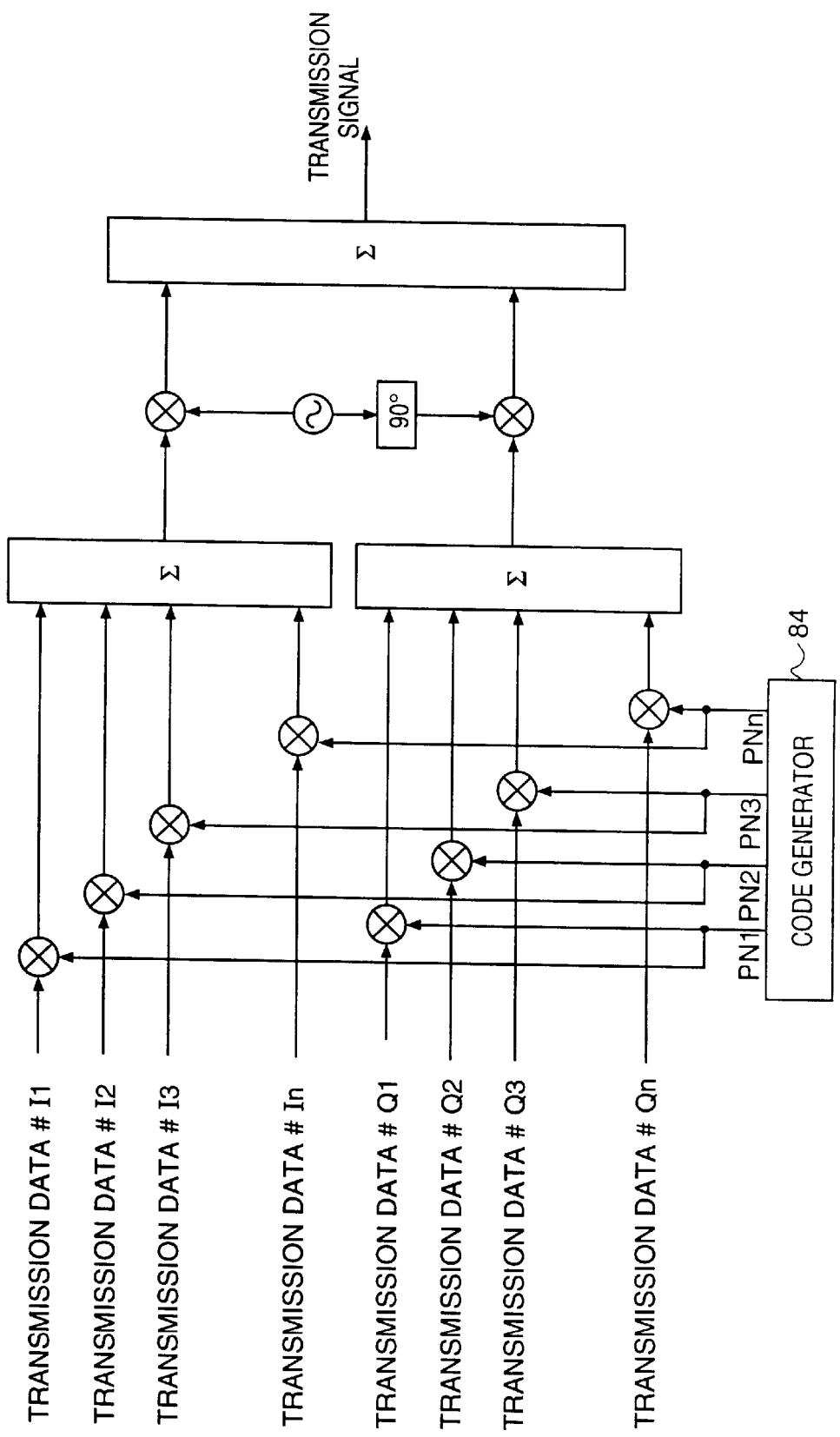
FIG. 17 is a block diagram showing a transmission unit in a conventional spread spectrum communication apparatus.
Figure 18:
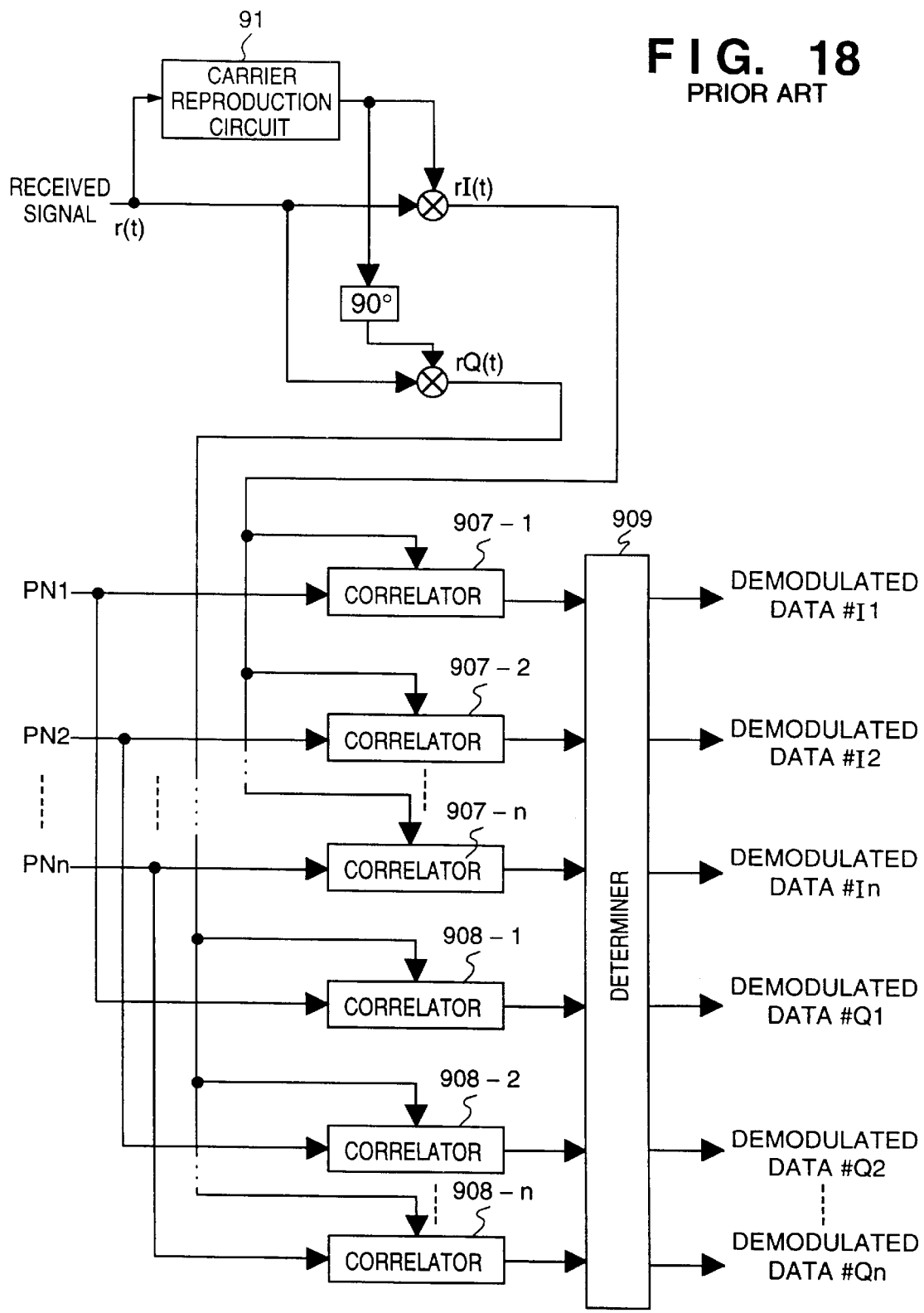
FIG. 18 is a block diagram showing a reception unit in the conventional spread spectrum communication apparatus.

An example in which n=8 will be described below in detail. When n=8, eight carriers out of phase by 22.5° are generated, as shown in FIG. 16. Signals which are spread-modulated in accordance with the eight carriers are BPSK-modulated and synthesized. The amplitude of the synthesized signal changes depending on the values of the eight spread-modulated signals to be synthesized. When the phases of all the signals after phase modulation are within 180°, the amplitude is maximized. When the amplitude of one modulated signal is represented by A, the amplitude is about 5.1 A. Assume that the eight spread codes used for spread modulation are quadrature codes. Since the average power is obtained by the sum of the powers of the modulated signals, the peak power with respect to the average power can be suppressed to be as low as about 5.2 dB.

Figure 14:
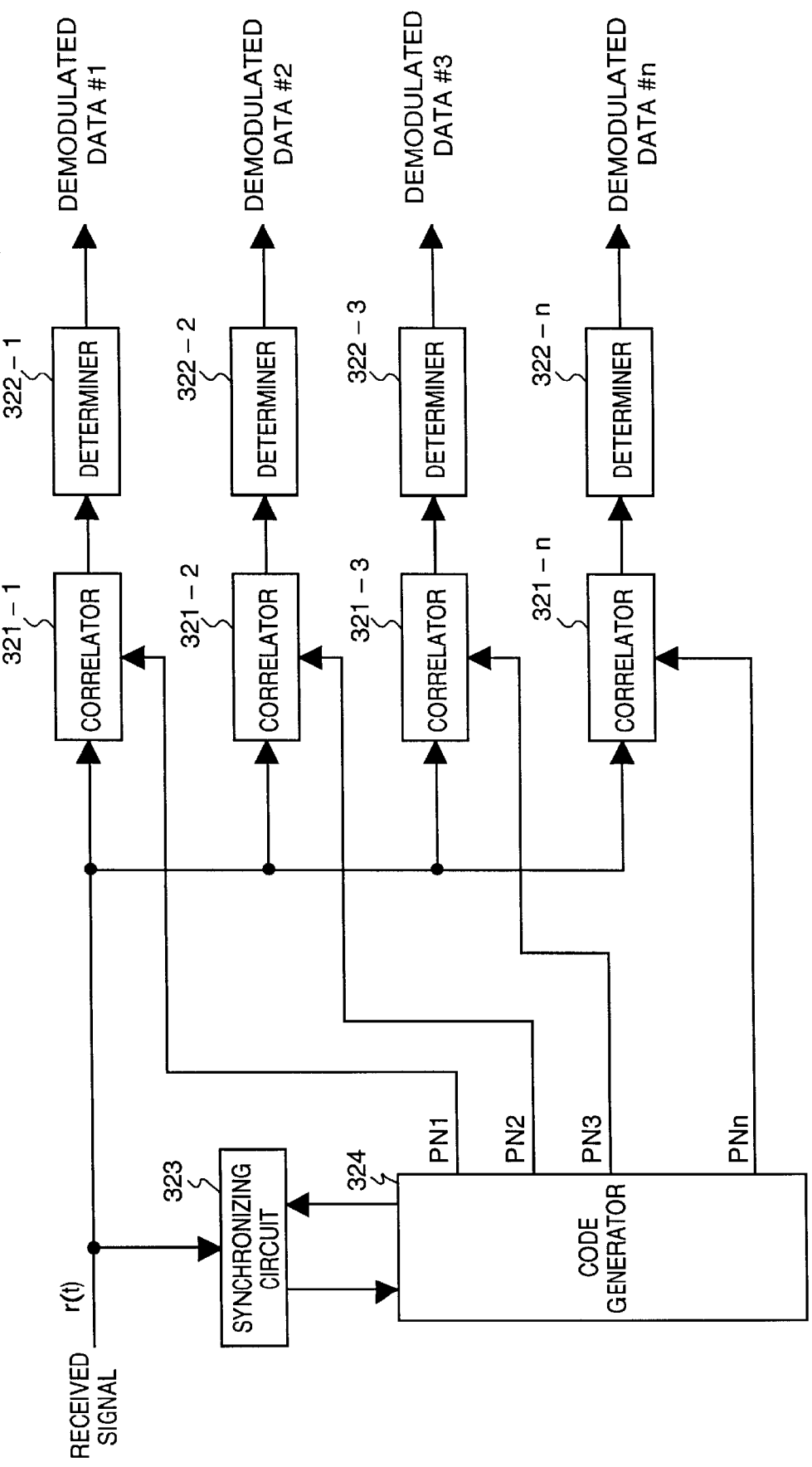
FIG. 14 is a block diagram showing the fifth reception unit in the spread spectrum communication apparatus in which the present invention is practiced.

FIG. 14 is a block diagram showing the schematic arrangement of the fifth reception unit in the spread spectrum communication apparatus of the present invention, which corresponds to the fourth transmission unit shown in FIG. 13. Referring to FIG. 14, reference numerals 321-1 to 321-n denote correlators for calculating correlations between the received signal and the spread codes $PN_1$ to $PN_n$ which are output from a code generator 324; 322-1 to 322-n, determiners for determining data on the basis of outputs from the correlators 321-1 to 321-n, respectively; 323, a synchronizing circuit for establishing clock synchronization and code synchronization between the received signal and the spread codes which are output from the code generator 324; and 324, the code generator for generating the spread codes.

In FIG. 14, the received signal r(t) is subjected to amplification, filtering, frequency conversion, or the like, as needed, and then branched. Part of the received signal is input to the synchronizing circuit 323, so that clock synchronization and code synchronization between the received signal and the spread codes which are output from the code generator 324 are established. Part of the received signal is further branched to n components and input to the correlators 321-1 to 321-n, so that correlations between the respective components and the spread codes $PN_1$ to $PN_n$ which are output from the code generator 324 are calculated. For example, the first correlator 321-1 calculates the correlation between the received signal and the first spread code $PN_1$, and the second correlator 321-2 calculates the correlation between the received signal and the second spread code $PN_2$. Assume that the spread codes $PN_1$ to $PN_n$ are quadrature codes, i.e., the cross-correlation values are zero when code synchronization is established. In this case, as the correlation outputs from the correlators 321-1 to 321-n, only a component modulated according to the spread code which is input to the correlator is output because components modulated other spread codes are removed. Therefore, the data are demodulated by the determiner 322-1 to 322-n on the basis of the correlation results from the correlators 321-1 to 321-n.

Figure 15:
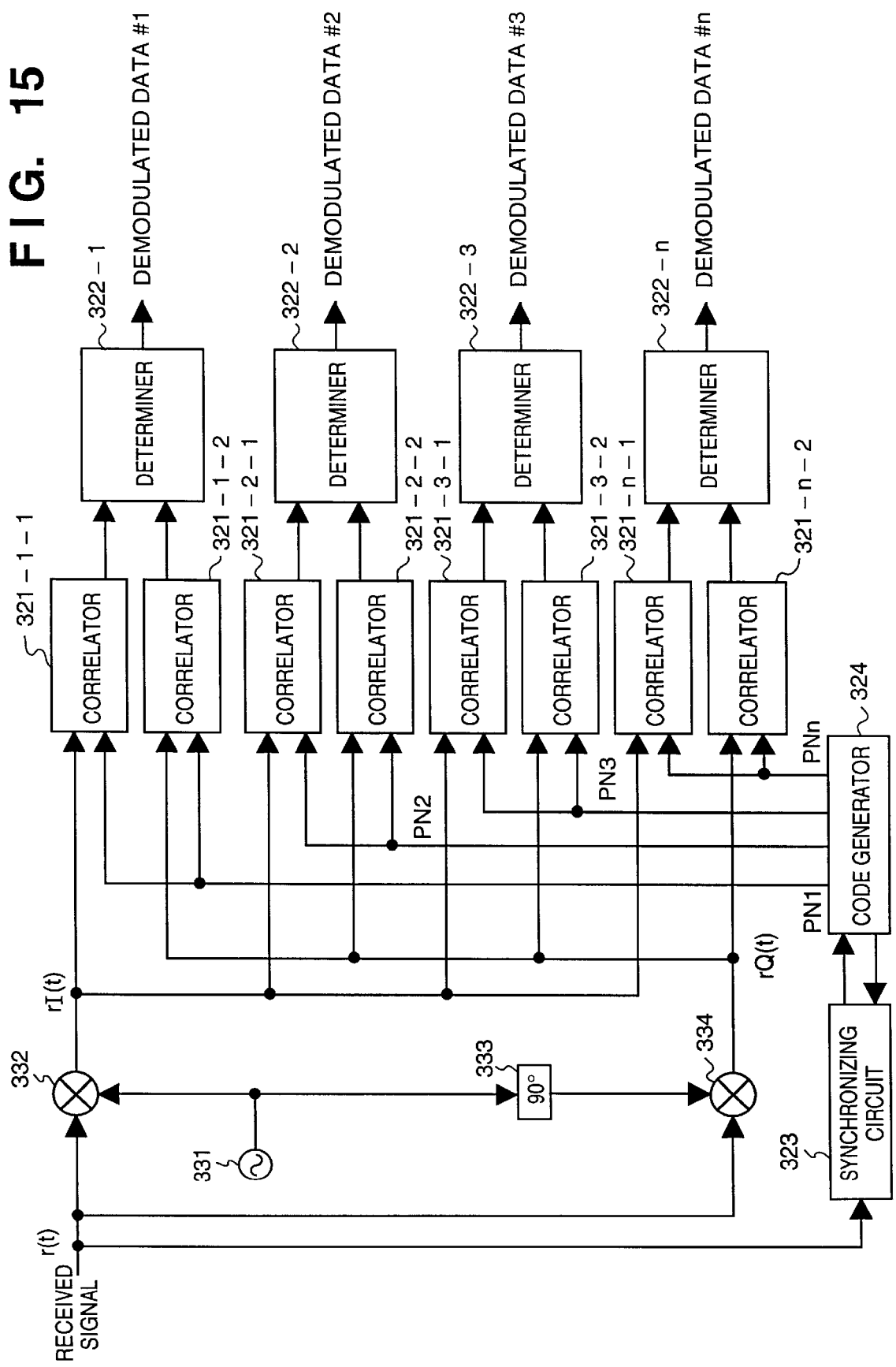
FIG. 15 is a block diagram showing the sixth reception unit in the spread spectrum communication apparatus in which the present invention is practiced.

An example in which a signal is converted into a quasi-baseband signal and then correlation calculation is performed in the reception unit will be described next. The transmission unit has the same arrangement as in FIG. 13. FIG. 15 is a block diagram of the sixth reception unit in the spread spectrum communication apparatus of the present invention. The same reference numerals as in FIG. 13 denote the same constituent elements in FIG. 15.

Referring to FIG. 15, an output signal from an oscillator 331 is a signal having a frequency which almost equals that of the received signal. The signal is input to a baseband converter 332 without any processing, and also input to a baseband converter 334 through a 90° phase shifter 333. With this arrangement, a baseband signal as an in-phase component and a baseband signal as a quadrature component are obtained, so that the phase relationship between the received signals can be stored by the two signals. The outputs $r_I$ and $r_Q$ from the baseband converters 332 and 334 are input to correlators 321-11 and 321-12 for the spread code $PN_1$ respectively, and correlations between the signals and the spread code $PN_1$ synchronized with the received signals are calculated. Since the spread code $PN_1$ and the spread codes $PN_2$ to $PN_n$ are quadrature codes or have small cross-correlation values, the in-phase and quadrature components of a component modulated according to the spread code $PN_1$ are extracted as outputs from the correlators 321-11 and 321-12, respectively. When these components are input to a determiner 322-1, the component modulated in accordance with the spread code $PN_1$ is demodulated. In a similar manner, the outputs $r_I$ and $r_Q$ from the baseband converters 332 and 334 are input to correlators 321-21, 321-22, 321-n1, and 321-n2 for the spread codes $PN_2$ to $PN_n$, respectively, and correlations between the signals and the spread codes $PN_2$ to $PN_n$ synchronized with the received signals are calculated. Since the spread codes $PN_1$ to $PN_n$ are quadrature codes or have small cross-correlation values, the in-phase and quadrature components of signals modulated in accordance with the respective spread codes are extracted from the correlators. When these components are input to determiners 322-2 to 322-n, the signals modulated according to the respective spread codes are demodulated.

The synchronizing circuit 323 is operated in accordance with a signal before conversion into a baseband signal. However, the synchronizing circuit 323 may be operated in accordance with a baseband signal.

Instead of making one spread code correspond to 1-bit transmission data, the present invention can be used for, e.g., so-called parallel combination in which a set of spread codes is made to correspond to a plurality of data.

As many apparently widely different embodiments of the present invention can be made without departing from the spirit and scope thereof, it is to be understood that the invention is not limited to the specific embodiments thereof except as defined in the appended claims.

What is claimed is:

1. A spread spectrum communication apparatus comprising:
    first, second and third differential modulators, arranged for differentially encoding first, second and third data sequences into first, second and third differentially encoded data sequences;
    a first spread modulator arranged for spreading the first differentially encoded data sequence in accordance with a first spread code;
    a second spread modulator arranged for spreading the second differentially encoded data sequence in accordance with a second spread code different from the first spread code;
    a third spread modulator arranged for spreading the third differentially encoded data sequence in accordance with a third spread code different from the first and second spread codes; and
    a transmitter, arranged for transmitting an output from said first and second spread modulator, and for transmitting an output from said third spread modulator on a first phase of a carrier different from a second phase of the carrier on which an output from said first spread modulator is transmitted.

2. The apparatus according to claim 1, further comprising a fourth spread modulator for spreading fourth differentially encoded data in accordance with a fourth spread code which is different from the first, second and third spread codes.

3. The apparatus according to claim 1, wherein the first and second phases are quadrature phases of the carrier.

4. A spread spectrum communication apparatus comprising:
    first and second differential modulators, arranged for differentially encoding first and second transmission data in units of first and second code divided channels and forming first and second n-phase shift keying modulated signals, wherein n is a natural number;
    third and fourth differential modulators, arranged for differentially encoding third and fourth transmission data in units of third and fourth code divided channels and forming first and second π/n-shifted n-phase shift keying modulated signals;
    first, second, third and fourth spread modulators, arranged for spreading the first and second n-phase shift keying modulated signals and the first and second π/n-shifted n-phase shift keying modulated signals using corresponding spread codes different from each other; and
    a transmitter, arranged for transmitting an output from said first, second, third and fourth spread modulators.

5. The apparatus according to claim 4, wherein said transmitter transmits the output from said first, second, third and fourth spread modulators on a quadrature phase of a carrier.

6. A spread spectrum communication apparatus comprising:
    a differential modulator for encoding first, second and third transmission data into first and second differentially encoded data; and
    a spread modulator for spreading the first differentially encoded data in accordance with a first spreading code and spreading the second differentially encoded data in accordance with a second spreading code,
    wherein said differential modulator encodes the first, second and third transmission data such that a difference between the first and second transmission data is encoded into the first differentially encoded data and a difference between the second and third transmission data is encoded into the second differentially encoded data.

7. An apparatus according to claim 6, further comprising a transmitter, arranged for transmitting the first differentially encoded data spread in accordance with the first spreading code via a first phase of a carrier and for transmitting the second differentially encoded data spread in accordance with the second spreading code via a second phase of the carrier.

8. An apparatus according to claim 7, wherein the first and second phases are quadrature phases of the carrier.

9. A method for a spread spectrum communication, comprising the steps of:
    encoding first, second and third transmission data into first and second differentially encoded data; and
    spreading the first differentially encoded data in accordance with a first spreading code and spreading the second differentially encoded data in accordance wiht a second spreading code,
    wherein the first, second and third transmission data are encoded in said encoding step such that a difference between the first and second transmission data is encoded into the first differentially encoded data and a difference between the second and third transmission data is encoded into the second differentially encoded data.

10. A method according to claim 9, wherein the first differentially encoded data spread in accordance with the first spreading code is transmitted via a first phase of a carrier and the second differentially encoded data spread in accordance with the second spreading code is transmitted via a second phase of the carrier.

11. A method according to claim 10, wherein the first and second phases are quadrature phases of the carrier.

* * * * *

UNITED STATES PATENT AND TRADEMARK OFFICE
CERTIFICATE OF CORRECTION

PATENT NO. : 6,320,842 B1 Page 1 of 1
DATED : November 20, 2001
INVENTOR(S) : Norihiko Mochizuki It is certified that error appears in the above-identified patent and that said Letters Patent is hereby corrected as shown below:

Title page,
Item [56], References Cited, FOREIGN PATENT DOCUMENTS,
"8167864" should read -- 8-167864 --.

Column 1,
Line 11, "U.S. Pat. No." should read -- U.S. Ser. No. --.

Column 3,
Line 19, "$PN_{n+m}$ to $PN_{n+m}$" should read -- $PN_{n+1}$ to $PN_{n+m}$ --.

Column 4,
Line 41, "correlators 55-11 and 55-12" should read -- correlators 55-1-1 and 55-1-2 --;
Line 50, "correlators 55-11 and 55-12," should read -- correlators 55-1-1 and 55-1-2, --.

Column 7,
Line 46, "demodulator 251" should read -- demodulator 25-1 --.

Column 11,
Line 4, "correlators 321-11 and 321-12" should read -- correlators 321-1-1 and 321-1-2 --;
Line 11, "321-11 and 321-12," should read -- 321-1-1 and 321-1-2, --;
Line 15, "correlators 321-21," should read -- correlators 321-2-1, --;
Line 16, "321-22, 321n1, and 321-n2" should read -- 321-2-2, 321-n-1, and 321-n-2 --;
Line 59, "modulator," should read -- modulators, --.

Column 12,
Line 56, "wiht" should read -- with --.

Signed and Sealed this

Fifteenth Day of April, 2003

JAMES E. ROGAN
*Director of the United States Patent and Trademark Office*